May 23, 1939.   C. J. MERSEREAU   2,159,395
TRAILER CONTROL
Filed June 29, 1938
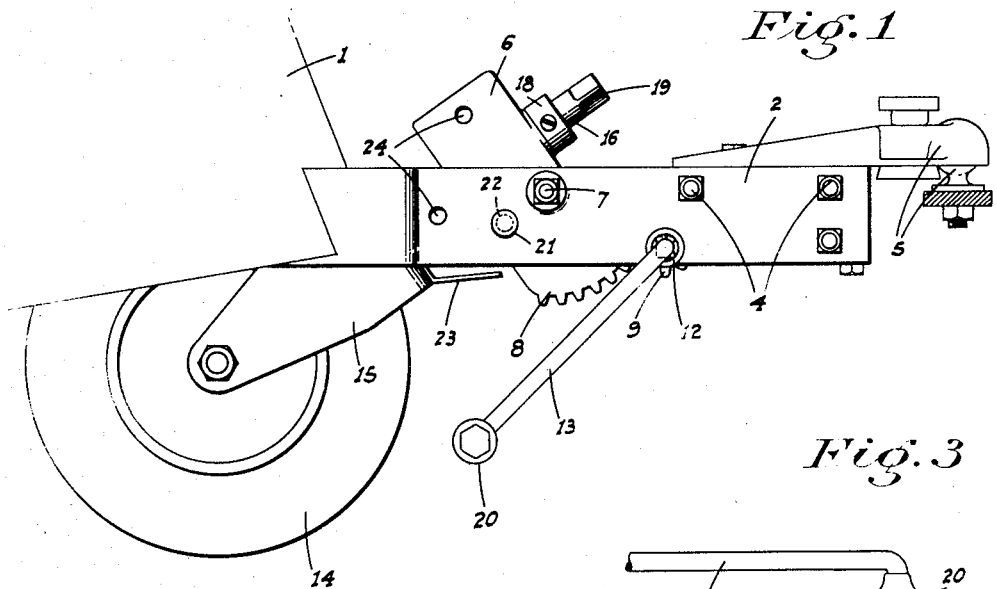
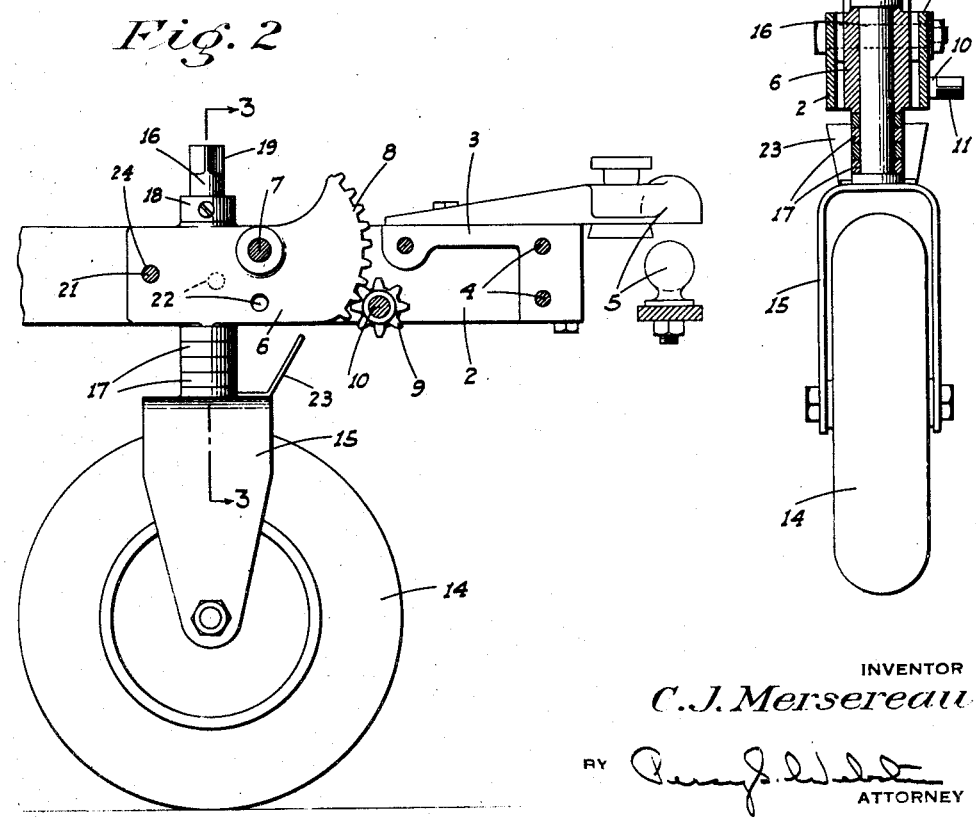
INVENTOR
C. J. Mersereau
BY
ATTORNEY Patented May 23, 1939

2,159,395

UNITED STATES PATENT OFFICE 2,159,395

TRAILER CONTROL

Charles J. Mersereau, Sacramento, Calif.

Application June 29, 1938, Serial No. 216,512

4 Claims. (Cl. 280—33.4)

This invention relates in general to a device for use in connection with trailers for motor vehicles, and in particular the invention is directed to a supporting wheel assembly incorporated with the tongue of a two wheel trailer.

At present, screw jacks and other similar supporting devices are employed to support the trailer tongue when detached from the motor vehicle, but such devices are subject to the objection that when in use, it is extremely difficult for a person to move the trailer.

It is therefore the principal object of this invention to provide a novel swivel wheel assembly for a two wheel trailer; the assembly being mounted in connection with the trailer tongue and arranged for use to facilitate engagement or disengagement of the coupler, and to provide a tongue support which makes possible easy movement and control of the trailer when uncoupled from the motor vehicle.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a side elevation of the device in inoperative position.

Figure 2 is a side elevation of the device in operative position, the near side plate of the tongue being removed.

Figure 3 is a cross section on line 3—3 of Fig. 2.

Referring now more particularly to the characters of reference on the drawing, the forwardly projecting tongue of the trailer 1 comprises a pair of transversely spaced steel plates 2 suitably secured at their inner ends on the trailer frame (not shown), and secured together at their outer ends by means of a metallic spacer block 3 and bolts 4. A ball and socket coupler 5, of usual type, is used to connect the trailer with the motor vehicle, the socket element being mounted on the block 3 and the ball on the vehicle as is usual.

A metallic block 6 is disposed between tongue plates 2 intermediate the ends of the tongue, and is fixed on a cross shaft 7 which is pivotally carried at the ends in the plates 2. The block 6 is thus mounted for pivotal movement in a vertical plane. The forward edge of block 6 is formed as a segmental gear 8 which meshes with a pinion 9 fixed on another cross shaft 10 journaled between the plates 2; one end of shaft 10 projecting outward beyond the adjacent plate and being formed as a nut, as at 11, to receive one socket 12 of a double ended socket wrench 13 of crank type.

The block 6 supports a swivel wheel unit which includes a wheel 14 journaled in a fork 15, and a stub shaft or spindle 16 fixed on and projecting from the end of the fork. The stub shaft 16 extends from beneath through a bore formed in the block 6 from its lower to upper edge and parallel to plates 2. A plurality of spacer collars 17 surround shaft 16 between block 6 and fork 15, while a thrust collar 18 is secured on the shaft 16 above block 6. The upper end of the shaft 16 is formed as a nut, as at 19, for engagement by a socket 20 on socket wrench 13.

When in an inoperative position, as shown in Fig. 1, the pinion 9 has been manually rotated, by means of wrench 13, in a direction to rock block 6 about its pivot and to swing the caster wheel rearwardly and upwardly until a portion thereof is disposed between plates 2 which are spaced apart to receive said portion. The device is held in such inoperative position by means of a pin 21 which is inserted in registering holes 22 through the plates 2 and block 6. This pin is preferably of the safety locking type which includes a pivoted locking element on the free end.

To place the device in an operative position when the trailer is to be uncoupled, the pin 21 is withdrawn from holes 22 and the block 6 run down to a horizontal position by means of the pinion and gear arrangement actuated by the wrench 13. When the shaft 16 reaches a vertical position, the wheel has engaged the ground and raised the tongue (as shown in Fig. 2) so that the coupler 5 can be disengaged with ease. The amount of "lift" is controlled by the number of collars 17 disposed on shaft 16.

To prevent the gear from running off the pinion at the end of the lowering movement of the swivel wheel unit, a stop member 23 is mounted on the end of fork 15 in upstanding position and arranged to engage with the lower edges of plates 2 immediately below gear 8. Also, the block 6 is locked in a horizontal position, after the swivel wheel unit is lowered, by inserting pin 21 in other registering holes 24.

After the swivel wheel unit has been lowered and locked in place and the coupler 5 disengaged, the wrench 13 is removed from the end 11 of shaft 10 and socket 20 engaged with the upper end 19 of shaft 16 as shown in Fig. 3. Thereafter the wrench is used as a steering arm or tiller for the ground engaging wheel 14.

With the improved assembly described above, a trailer when disconnected from the motor vehicle can be easily moved about and at the same time controlled in its direction of movement as when moving the trailer into a curb or to the motor vehicle for coupling therewith.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A trailer tongue control assembly for a trailer tongue including laterally spaced plates, said assembly comprising a block pivoted between the plates for swinging movement in a vertical plane, a segmental gear on one end of the block, a shaft extending between the plates adjacent said gear, a pinion on the shaft and meshing with the gear, one end of the shaft being exposed and formed for cooperative engagement with a socket wrench, and a swivel wheel unit including an upstanding spindle, the spindle extending upward through the block and being journaled therein.

2. An assembly as in claim 1 including stop means to limit movement of the wheel unit beyond a substantially vertical position in one direction.

3. A trailer tongue control assembly for a trailer tongue including laterally spaced plates, said assembly comprising a block pivoted between the plates for swinging movement in a vertical plane, means to swing the block, a swivel wheel unit including a yoke and an upstanding spindle, the spindle projecting through the block from beneath and being journaled therein, a removable collar surrounding the spindle between the fork and the block, a thrust collar secured on the spindle above the block; the spindle extending beyond the thrust collar and there arranged for connection with a steering member.

4. A trailer tongue control assembly comprising a supporting member, means to pivot the member on the tongue for swinging movement in a vertical plane, means to so swing the member, and a swivel wheel unit below and including a spindle journaled in the member; said member being adapted to swing in a direction to raise the wheel rearwardly and upwardly and the tongue comprising plates between which the member is disposed and spaced apart a sufficient distance in the plane of upward movement of the wheel to receive a portion of said wheel therebetween when the wheel is raised.

CHARLES J. MERSEREAU.